(12) United States Patent
Seger et al.

(10) Patent No.: US 7,474,798 B2
(45) Date of Patent: Jan. 6, 2009

(54) METHOD AND DEVICE FOR IMAGE PROCESSING, IN ADDITION TO A NIGHT VIEWING SYSTEM FOR MOTOR VEHICLES

(75) Inventors: Ulrich Seger, Warmbronn (DE); Franz Matthias, Tubingen (DE)

(73) Assignee: Robert Bosch GmbH, Stuttgart (DE)

( * ) Notice: Subject to any disclaimer, the term of this patent is extended or adjusted under 35 U.S.C. 154(b) by 737 days.

(21) Appl. No.: 10/477,843

(22) PCT Filed: Nov. 25, 2002

(86) PCT No.: PCT/DE02/04318

§ 371 (c)(1),
(2), (4) Date: Nov. 14, 2003

(87) PCT Pub. No.: WO03/063468

PCT Pub. Date: Jul. 31, 2003

(65) Prior Publication Data

US 2004/0136605 A1 Jul. 15, 2004

(30) Foreign Application Priority Data

Jan. 22, 2002 (DE) ................. 102 02 163

(51) Int. Cl.
*G06K 9/40* (2006.01)
*G06K 9/00* (2006.01)
(52) U.S. Cl. ................. 382/274; 382/168; 382/263

(58) Field of Classification Search ......... 382/103–104, 382/168–169, 254, 260, 263–264, 266–268, 382/274–275, 299, 305, 312; 250/330, 334; 348/230.1
See application file for complete search history.

(56) References Cited

U.S. PATENT DOCUMENTS

| 5,414,439 | A | | 5/1995 | Groves et al. | |
|---|---|---|---|---|---|
| 5,729,016 | A | * | 3/1998 | Klapper et al. | 250/334 |
| 6,420,704 | B1 | * | 7/2002 | Berenz et al. | 250/330 |
| 6,611,627 | B1 | * | 8/2003 | LaRossa et al. | 382/240 |
| 6,646,680 | B1 | * | 11/2003 | Mead et al. | 348/230.1 |
| 6,915,024 | B1 | * | 7/2005 | Maurer | 382/274 |

FOREIGN PATENT DOCUMENTS

| EP | 0 849 940 | 6/1998 |
|---|---|---|
| EP | 1 117 088 | 7/2001 |

(Continued)

OTHER PUBLICATIONS

Patent Abstracts of Japan, vol. 2000, No. 04, Aug. 31, 2000.

(Continued)

*Primary Examiner*—Kanji Patel
(74) *Attorney, Agent, or Firm*—Kenyon & Kenyon LLP

(57) ABSTRACT

A method and a device for image processing and for a night vision system for motor vehicles, in which a standard camera that is sensitive in the near infrared delivers images which are displayed on a display arrangement having a lower resolution than the camera. In addition, the image processing method improves the raw images of the sensor using image-sharpening methods and/or contrast-enhancing methods, so that display on a display arrangement is made possible for viewing by a viewer.

10 Claims, 3 Drawing Sheets

FOREIGN PATENT DOCUMENTS

| | | |
|---|---|---|
| JP | 11 196 298 | 7/1999 |
| JP | 2000 019 259 | 1/2000 |

OTHER PUBLICATIONS

Springer T et al: "Restoration of thermographic images using interactive inverse filtering (laser surgery application)" IEEE Engineering in Medicine & Biology Society 11th Annual International Conference 1989, XP010089030 Abschnitt 'Analysis of the Problem'.

Mulvanny P et al: "Advanced systems for automotive applications. Digital camera systems-the big picture" Enhanced and Synthetic Vision 1997, Orlando, FL, USA, Apr. 21-22, 1997, Bd. 3088, pp. 205-216, XP008015965 Proceedings of the SPIE—The International Society for Optical Engineering, 1997, SPIE-Int. Soc. Opt. Eng. USA INNS: 0277-786X.

* cited by examiner

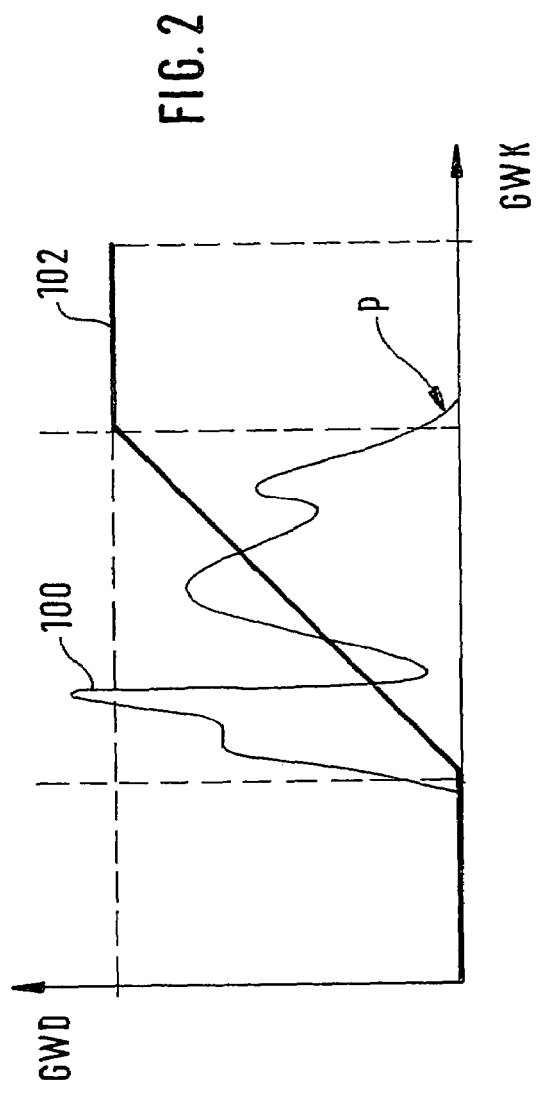
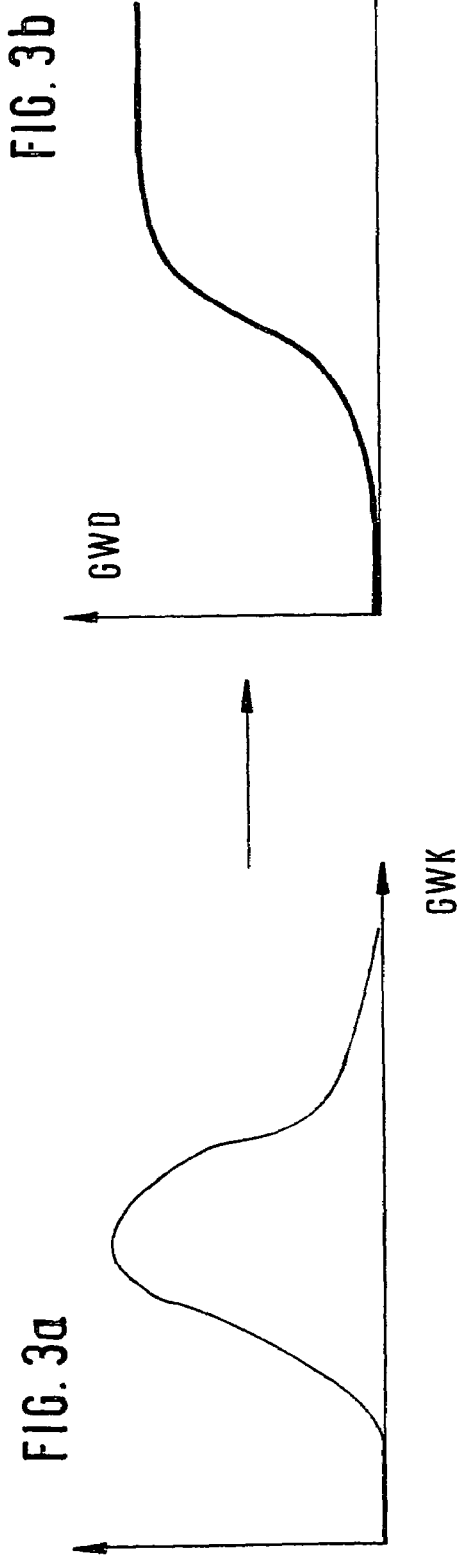

METHOD AND DEVICE FOR IMAGE PROCESSING, IN ADDITION TO A NIGHT VIEWING SYSTEM FOR MOTOR VEHICLES

FIELD OF THE INVENTION

The present invention relates to a method and a device for image processing as well as a night vision system for motor vehicles.

BACKGROUND INFORMATION

One application of video technique in the motor vehicle field is that of night vision systems. In this context, heat-sensitive cameras as well as a projection unit may be used, which project the visible images recorded by the camera onto the windshield (so-called head-up displays). U.S. Pat. No. 5,414,439 is an example of such a night vision system. The expenditure for such a night vision system may be considerable, particularly because of the high cost of these components.

SUMMARY OF THE INVENTION

By using a camera (for example, a "standard" camera, such as, for example, an OCD camera or a CMOS camera) that is sensitive to the near infrared, particularly in connection with a cost-effective display arrangement (such as, for example, LCD displays) the expenditure for such a night vision system may be considerably reduced.

Furthermore, by sharpening the image of the optical sensor (camera, sensor array) and or by improving the gain in the contrast of the image, the quality of the images recorded in the near infrared may be considerably improved, so that it may be used as a night vision system for motor vehicles.

The sharpening of the image may be achieved by an image processing module, which sharpens the unsharp images created by the reflection of the incident infrared light at the rear wall of the housing of the optical sensor as a result of the transparency to infrared light of the silicon of the sensor chip. These methods, which may be available in principle, enhance the edges of the image, which appear blurred by unsharp imaging. Thereby an image is reconstructed which appears sharp to a viewer. The use of so-called inverse filtering may be particularly advantageous.

To enhance the contrast, an adaptive imaging function, which may be a nonlinear characteristic function, may be used to image the gray-scale values present in the image in the value range of the gray-scale values of the display. This allows a sensor having a higher number of gray-scale values to be used in connection with a display which is only able to show fewer gray-scale values. It may be of particular advantage that the image created, that has its contrast enhanced, displays to the viewer all the essential details, since frequent gray-scale value regions are shown at high resolution and rarer gray-scale value regions are shown at low resolution.

Depending on the application example, image sharpening and contrast enhancement may be used jointly, or one procedure may be used by itself.

It may be particularly expedient, when using both modules, to carry out or perform the image sharpening first, and then the contrast enhancement, since the frequency of certain gray-scale values is changed by the image sharpening. This may yield a reliable reconstruction of the originally unsharp image that is relatively poor in contrast.

These measures for image processing (image sharpening, contrast enhancement) are also used apart from motor vehicle applications, both in the infrared and the visible range, when unsharp images have to be processed.

BRIEF DESCRIPTION OF THE DRAWINGS

FIG. 2 shows an exemplary embodiment, which is used for the formation of the imaging function for the contrast enhancement.

FIGS. 3a and 3b show an exemplary embodiment, which is used for the formation of the imaging function for the contrast enhancement.

DETAILED DESCRIPTION

Figure 1:
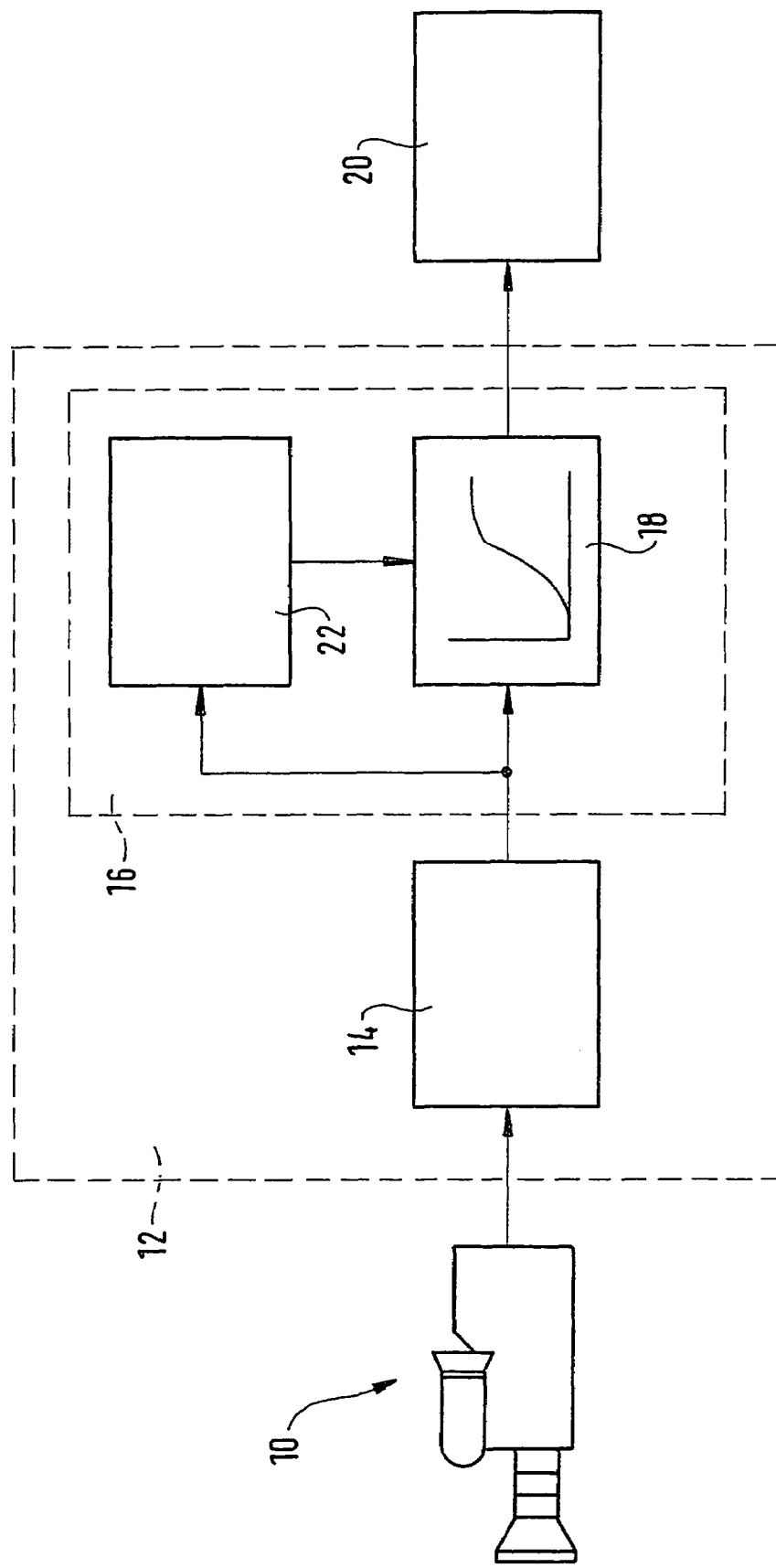
FIG. 1 shows an image processing system, particularly a night vision system for motor vehicles, in which image sharpening and contrast enhancement modules are used.

FIG. 1 shows an arrangement or layout of an image processing system, having an optical sensor 10, particularly of a standard camera sensitive to the near infrared, which releases raw images to a processing unit 12. Processing unit 12, which, depending on the exemplary embodiment, is made up of separate signal processing units or of one digital processor, has an image sharpening module 14 as well as a contrast enhancement module 16. Image sharpening module 14 converts the raw images delivered by camera 10 into sharpened images, which are released to the contrast enhancement module. Contrast enhancement module 16 is made up of an imaging function 18, which may be a nonlinear characteristic curve, which converts the sharpened images delivered by image sharpening module 14 into high-contrast images adapted to display 20 used. In addition, an imaging function calculating module 22 is a component of the contrast enhancement module. On the basis of the sharpened images delivered by image sharpening module 14, it ascertains or determines the imaging function (characteristic curve 18). Contrast enhancement module 16 then outputs the images, weighted by characteristic curve 18 and sharpened, as contrast-enhanced images to display 20 for display.

As to camera 10, this may be a "standard" camera which is used in various applications, and which is sensitive in the visible range and in the near infrared. The sensitivity to the near infrared, in this context, is achieved, for example, by doing without filtering measures that are at times provided in such standard cameras. Display 20 involves a display arrangement which can show a lesser number of gray-scale values than the camera. An example is an LCD display, on which the images recorded by the camera, especially the night vision images of the motor vehicle surroundings are shown visibly to the driver.

Depending on the particular arrangement, an image sharpening module and a contrast enhancement module may be used jointly or separately (i.e. only one of the modules is used). The sequence of the procedure, first image sharpening, then contrast enhancement, is expedient when both modules are used for image processing.

The system shown in FIG. 1, in an exemplary embodiment, represents a night vision system for motor vehicle applications in which the "standard" camera takes an image in the near infrared in combination with a suitable illumination of the road area in front of the vehicle. The illumination may, for instance, come from a vehicle headlight or from an additional floodlight having infrared light components. The night vision images taken are then displayed to the driver with the aid of the image processing shown. In the exemplary embodiment, a camera is used which can show up to 4096 gray-scale values, whereas the display used can typically only show 64 gray-scale values.

In the exemplary embodiment, image sharpening module 14 works with the aid of an image sharpening method in which the edges of the image, which appear blurred by the unsharp imaging, are enhanced. In the exemplary embodiment, so-called inverse filtering is used as the method. In this context, the unsharpness of the imaging in the near infrared is described by a so-called point-spread function or by its Fourier-transformed function, the modulation transfer function. In the exemplary embodiment, this function is measured for the type of camera by a standard method at an infrared illumination adjusted to the vehicle's headlight. This modulation transfer function is inverted and transformed back again into local space so that a filter mask is obtained which in the ideal case exactly compensates for the unsharpness due to reflection.

In this context, with respect to the spatial frequencies, this filter mask has high pass characteristics, i.e. lower spatial frequencies are damped more strongly than higher spatial frequencies. An exact compensation of the unsharpness conditioned by reflection, as a rule, cannot be achieved in practice by quantization effects and/or saturation effects, so that some detail is lost. It is believed, however, that this is minor when using a display of low resolution, since the loss of detail is not discernable by the viewer. Therefore, the method removes the unsharpness that may be present in the imaging in a sufficient measure.

Consequently, from the image sharpening module, upon photographing a test image (such, for example, as the well known Siemens Star), there results an enhanced contrast of the image in the range of the short spatial wavelengths, i.e. the higher frequencies. This effect becomes clearer if, in the test sample, a sine-shaped instead of a rectangular curve is specified, since in that case the influence of the higher harmonics drops out, and furthermore the amplitude of the intensity fluctuation is not a maximum.

For contrast enhancement, two methods for calculating an imaging function (characteristic curve) are shown below, with whose assistance the gray-scale values of the (possibly sharpened) camera imaging are converted to gray-scale values of the display. Which of the two methods is used depends on the specific application.

A first method for contrast enhancement is shown in the light of the diagram in FIG. 2. In this diagram the gray-scale values of display GWD is plotted against the gray-scale values of camera GWK. The point of departure is histogram 100 of the gray-scale values of the camera image, which is also drawn in FIG. 2. In this histogram, the frequency of the individual gray-scale values in the analyzed image is plotted. From histogram 100 there is then derived a gray-scale value range of the camera image, which covers a predefined percentage of the gray-scale values of the camera image.

In the exemplary embodiment, the limits of these gray-scale value ranges are established so that a predetermined percentage of the low gray-scale values and a certain percentage of the highest gray-scale values of the camera image (e.g. 5% each) do not fall within the designated segment. From these so-called "p" percentiles of the histogram, the position of the segment borders (minimum and maximum gray-scale value) is determined for each camera image. Based on the calculated segment borders, a characteristic curve 102 is then derived, which in the variant shown is piecewise linear, and which images m gray-scale values of the camera imaging per n gray-scale values of the display (as a rule, m being >n).

In this context, the characteristics curve or the imaging function is made up of three sections: in the first section, all camera gray-scale values are imaged at the lowest gray-scale value of the display, in the middle section, m gray-scale values of the camera image are imaged at n gray-scale values of the display, and in the last section, all camera gray-scale values are imaged at the highest display gray-scale value. Since the gray-scale values of the camera image that are to be imaged have a higher number than that of the display, it is therefore through the linear part of function 102 that gray-scale value ranges of the camera are converted to a gray-scale value of the display. Thus the function executes a "clipping" operation, and compresses or spreads apart the middle gray-scale value range of the camera imaging to the display gray-scale values.

A second method is shown in the light of the illustrations in FIGS. 3a and 3b. This method is denoted as a histogram adjustment. In this instance, the cumulative distribution function is formed from histogram 100, by adding on the histogram values one after another (integrating). This is shown in FIG. 3a, in which the frequency of the camera gray-scale values is plotted against the possible camera gray-scale values. From this distribution function (histogram) then, according to FIG. 3b, a nonlinear characteristics curve or imaging function shown in FIG. 3b is ascertained by adding on the frequency values.

This characteristics curve serves as the basis of the conversion of the gray-scale values range of camera GWK to the gray-scale values GWD of the display. The imaging curve shown allocates to every gray-scale value range of the camera image the optimal resolution in the gray-scale value range of the display. Since the gray-scale number of the display is less than that of the camera image, the imaging curve has to be subsampled with the number of gray-scale values available in the display. In this manner, certain gray-scale value ranges of the camera have only one gray-scale value assigned to them. To more frequent camera gray-scale values (see area of greater rise in the characteristic curve) a greater number of display gray-scale values is assigned (higher resolution), and to less frequently appearing camera gray-scale values (flatter characteristic curve area) a lesser number of display gray-scale values is assigned.

Depending on the exemplary embodiment, the characteristic curve or the imaging function is calculated anew according to one of the named methods for each image or for every $n^{th}$ image. The imaging function may be low-pass filtered, so as to suppress the noise in the histogram.

The advantages of using such an adaptive, nonlinear characteristics curve or imaging function may be demonstrated likewise when images are taken of test samples. If, for example, two gray-scale value wedges having different upward slopes of the intensity profile are photographed, the adaptive characteristic curve or imaging function achieves that both test samples in the image shown appear the same.

Figure 4:
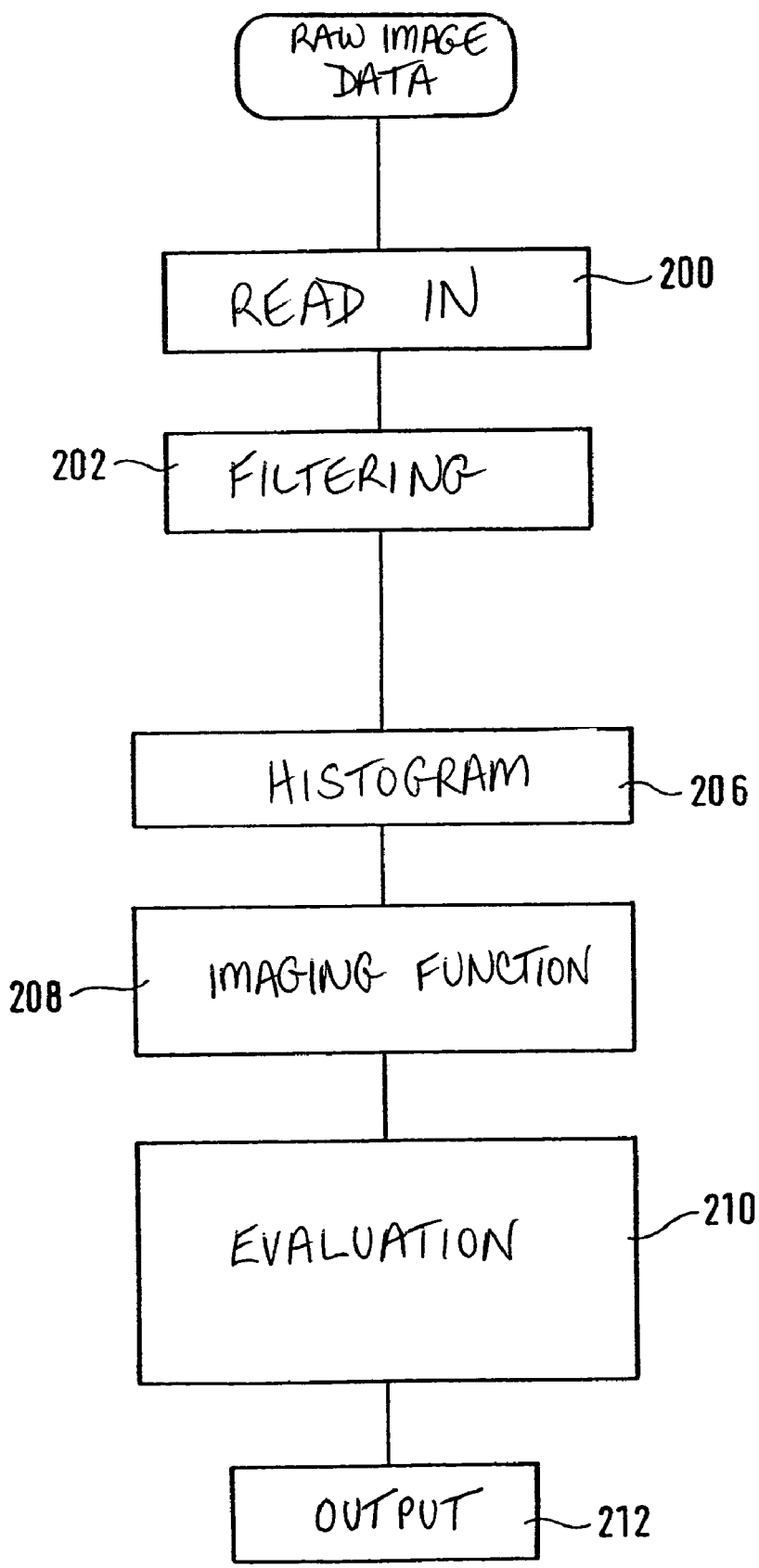
FIG. 4 shows a flow diagram of an example implementation of the described procedure as a computer program.

In the exemplary embodiment, the image processing (image sharpening and contrast enhancement) is carried out or performed in one computer, which converts the raw images delivered by the camera into high-contrast, sharpened images for display indication. In this context, the procedure explained above is implemented as a computer program. An example of such a computer program is shown in the flow diagram in FIG. 4.

The raw image delivered by the camera is read in according to step 200. In step 202 the image is filtered using the specified filter mask. This represents the sharpened image. From this image, according to step 206, the histogram is derived, and in step 208 the imaging function is generated according to one of the methods described above. Thereafter, in step 210, the sharpened image is weighted with the imaging function that was ascertained, i.e. gray-scale value ranges of the image are converted into a display gray-scale value according to the imaging function, and then, in step 212, are output to the display. In this context, the program sketched using the flow diagram is run through for each raw image. In one exemplary embodiment, the imaging function is ascertained only for one predetermined number of images (e.g. for every tenth one).

An example application of the procedural method shown is a night vision system for motor vehicles. However, the procedural method shown may also be applied outside of this application case, for other night vision applications, or in image processing systems in the near infrared or in the visible range, in which unsharp images are created or images of high resolution are shown using displays having low resolution.

In addition, the procedural method described may also be applied in connection with colored images, or in any other suitable application.

What is claimed is:

1. A method for image processing, comprising:
   displaying images, taken using an optical sensor, on a display arrangement having a lower resolution compared to that of the optical sensor;
   performing (i) sharpening the images detected by the optical sensor using an image sharpening process to sharpen the image for the displaying, and (ii) converting the images to high-contrast images for the displaying using a contrast enhancement process,
   wherein to enhance the contrast of the image, an adaptive imaging function images gray-scale values present in the image in gray-scale values of the display arrangement and wherein the adaptive imaging function includes a piecewise linear function which is derived from a histogram of a camera image.

2. The method of claim 1, wherein raw images delivered by the optical sensor are first sharpened to provide a sharpened image, and then a contrast of the sharpened image is enhanced.

3. The method of claim 1, wherein the optical sensor includes a standard camera that is sensitive to near infrared radiation.

4. The method of claim 3, wherein the camera is a CMOS camera.

5. The method of claim 3, further comprising:
   illuminating a target area to be imaged using the camera, wherein the illumination is provided by one of a vehicle headlight and a floodlight.

6. The method of claim 1, wherein to sharpen the images, edges shown as unsharp in the images are enhanced.

7. The method of claim 1, wherein to sharpen the images, edges shown as unsharp in the images are enhanced by inverse filtering of the images.

8. A method for image processing, comprising:
   displaying images, taken using an optical sensor, on a display arrangement having a lower resolution compared to that of the optical sensor; and
   performing (i) sharpening the images detected by the optical sensor using an image sharpening process to sharpen the image for the displaying, and (ii) converting the images to high-contrast images for the displaying using a contrast enhancement process,
   wherein to enhance the contrast of the image, an adaptive imaging function images gray-scale values present in the image in gray-scale values of the display arrangement; and
   wherein the adaptive imaging function is a distribution function which is derived from a histogram of a camera image.

9. A device for image processing, comprising:
   a display arrangement to display images, taken using an optical sensor, on a display arrangement having a lower resolution compared to that of the optical sensor;
   an evaluation and processing arrangement to receive the images from the optical sensor, including:
   (i) a sharpening arrangement to sharpen the images detected by the optical sensor using an image sharpening process to sharpen the image for the displaying, and
   (ii) a contrast-enhancing arrangement to convert the images to high-contrast images for the displaying using a contrast enhancement process;
   wherein to enhance the contrast of the image, an adaptive imaging function images gray-scale values present in the image in gray-scale values of the display arrangement;
   wherein the adaptive imaging function includes a piecewise linear function which is derived from a histogram of a camera image; and
   wherein the processed images are provided to and displayed on the display arrangement.

10. A device for image processing, comprising:
    a display arrangement to display images, taken using an optical sensor, on a display arrangement having a lower resolution compared to that of the optical sensor;
    an evaluation and processing arrangement to receive the images from the optical sensor, including:
    (i) a sharpening arrangement to sharpen the images detected by the optical sensor using an image sharpening process to sharpen the image for the displaying, and
    (ii) a contrast-enhancing arrangement to convert the images to high-contrast images for the displaying using a contrast enhancement process; wherein the processed images are provided to and displayed on the display arrangement,
    wherein to enhance the contrast of the image, an adaptive imaging function images gray-scale values present in the image in gray-scale values of the display arrangement;
    wherein the adaptive imaging function is a distribution function which is derived from a histogram of a camera image; and
    wherein the processed images are provided to and displayed on the display arrangement.

* * * * *